(12) United States Patent
Lv

(10) Patent No.: US 10,016,102 B2
(45) Date of Patent: Jul. 10, 2018

(54) SUCTION APPARATUS, GLASS-WIPING DEVICE, AND RUN CONTROL METHOD THEREFOR

(71) Applicant: ECOVACS ROBOTICS CO., LTD., Jiangsu (CN)

(72) Inventor: Xiaoming Lv, Jiangsu (CN)

(73) Assignee: Ecovacs Robotics Co., Ltd., Jiangsu (CN)

( * ) Notice: Subject to any disclaimer, the term of this patent is extended or adjusted under 35 U.S.C. 154(b) by 808 days.

(21) Appl. No.: 14/389,938

(22) PCT Filed: Apr. 3, 2013

(86) PCT No.: PCT/CN2013/073730
§ 371 (c)(1),
(2) Date: Apr. 15, 2015

(87) PCT Pub. No.: WO2013/149590
PCT Pub. Date: Oct. 10, 2013

(65) Prior Publication Data
US 2015/0305581 A1 Oct. 29, 2015

(30) Foreign Application Priority Data

Apr. 5, 2012 (CN) .......................... 2012 1 0097694

(51) Int. Cl.
*A47L 1/02* (2006.01)
*G05B 23/02* (2006.01)
(Continued)

(52) U.S. Cl.
CPC ................. *A47L 1/02* (2013.01); *A47L 11/38* (2013.01); *F04C 28/24* (2013.01); *F16B 47/00* (2013.01);
(Continued)

(58) Field of Classification Search
CPC ........ G05B 15/00; G05B 15/02; G05B 21/00; G05B 21/02; G05B 23/00; G05B 23/02; A47L 1/00; A47L 1/02; A47L 11/38
(Continued)

(56) References Cited

U.S. PATENT DOCUMENTS 4,997,052 A * 3/1991 Urakami ................ B62D 57/00
114/222
5,890,250 A * 4/1999 Lange ...................... A47L 1/02
15/103
(Continued)

FOREIGN PATENT DOCUMENTS

CN 201029844 3/2008
CN 101623868 1/2010
(Continued)

OTHER PUBLICATIONS

European Supplementary Search Report dated Mar. 3, 2016 in connection with related European Patent Application No. EP13773149.

*Primary Examiner* — Jason D Mitchell
(74) *Attorney, Agent, or Firm* — Berliner & Associates

(57) ABSTRACT

A suction apparatus, a glass-wiping device and a run control method thereof. The suction apparatus comprises a suction cup unit (1). The suction cup unit (1) comprises an inner suction cup (11) and an outer suction cup (12). The inner suction cup (11) is arranged on the inside of the outer suction cup (12). A chamber on the inside of the inner suction cup (11) forms an inner negative pressure chamber (13) via vacuum suction. A chamber between the inner and outer suction cups (11 and 12) forms an outer negative pressure chamber (14) via vacuum suction. The outer negative pressure chamber (14) is connected to a vacuum detection unit. The vacuum detection unit comprises a distensible piece (20) and a distension-sensing piece (21). The distensible
(Continued)

piece (20) is sealedly connected onto an opening on the top end of the outer negative pressure chamber (14). The distensible piece (20) has arranged thereon the distension-sensing piece (21). The glass-wiping device is provided with the suction apparatus, when in cases of failure of the outer suction cup (12) in the suction apparatus and of failure of the outer negative pressure chamber (14), the glass-wiping device will take measures immediately to prevent an increased number of small protrusions from entering the inner suction cup (11), thus preventing the phenomenon of the glass-wiping device falling off a wall from occurrence.

10 Claims, 2 Drawing Sheets

(51) Int. Cl.
  *A47L 11/38*   (2006.01)
  *F04C 28/24*   (2006.01)
  *F16B 47/00*   (2006.01)
  *G05B 15/02*   (2006.01)

(52) U.S. Cl.
  CPC ............. *G05B 15/02* (2013.01); *G05B 23/02* (2013.01); *A47L 2201/04* (2013.01)

(58) Field of Classification Search
  USPC ........................................................ 700/282
  See application file for complete search history.

(56)        References Cited

U.S. PATENT DOCUMENTS 6,854,412 B1    2/2005  Courson et al.
  8,127,390 B2 *  3/2012  Kim ......................... A47L 1/02
                                                     15/103
  2003/0009844 A1*  1/2003  Bruntrup ................... A47L 1/02
                                                     15/344
  2003/0048081 A1*  3/2003  Seemann ............... B62D 55/00
                                                     318/68
  2004/0018100 A1*  1/2004  Takagi .................. F04B 49/065
                                                     417/322
  2006/0143845 A1*  7/2006  Miyake ..................... A47L 1/02
                                                     15/103
  2006/0278001 A1* 12/2006  Kaneko ............... G01L 19/0007
                                                     73/706
  2010/0042059 A1*  2/2010  Pratt .................... A61M 1/0031
                                                     604/318
  2010/0076606 A1*  3/2010  Gatley .................. F04D 27/004
                                                     700/276
  2015/0089763 A1*  4/2015  Lv ............................. A47L 1/02
                                                     15/250.11
  2015/0107043 A1*  4/2015  Lv ............................. A47L 1/02
                                                     15/250.11
  2015/0113752 A1*  4/2015  Lv ............................. A47L 1/02
                                                     15/250.001
  2015/0251318 A1*  9/2015  Lv ........................... A47L 9/009
                                                     180/8.1
  2015/0282684 A1* 10/2015  Lv ............................. A47L 1/02
                                                     15/250.001

FOREIGN PATENT DOCUMENTS

CN      201506669          6/2010
  CN      102009707          4/2011
  CN      202669947          1/2013
  JP      60-078877  A       5/1985
  JP      06-190747  A      12/1994
  JP    2003530933  A       10/2003
  JP    2008149435  A        7/2008
  RU       1771958  A       10/1992

* cited by examiner

SUCTION APPARATUS, GLASS-WIPING DEVICE, AND RUN CONTROL METHOD THEREFOR

FIELD OF THE INVENTION

The present invention belongs to a technical field of the manufacturing of small household electric appliances, and in particular relates to a suction apparatus, glass-wiping device and run control method thereof.

BACKGROUND ART

In daily life, people generally use a wiping rag to wipe and clean a small piece of glass, while a rod-type glass cleaning wipe is usually used to wipe and clean a big piece of glass and the external facade of a window. However, while a person is wiping a glass using the rod-type glass-cleaning wipe, he or her arms may easily get tired. In view of this problem, a window-cleaning device with a single suction cup which is now commercially available is capable of cleaning a high-level glass curtain wall. Such window-cleaning device is attached on a vertical wall surface by a vacuum suction cup and is independently driven to run by a wheel or track. However, the above-mentioned single-sided window-cleaning device has a defect as follows, while the wheel is rolling, the portion between a vacuum chamber and the wall surface is in the state of sliding friction, so that the sealing gas is inevitably leaked. In such case, if the glass-wiping device further encounters a gap or more small bumps, gas leakage may be easily caused, which leads to an atmospheric pressure unbalance. As a result, the device can not ensure sufficient vacuum pressure, thus may fall off from the wall surface.

SUMMARY OF THE INVENTION

In view of the deficiency in the prior art, the technical problem which the present invention seeks to solve is to provide a suction apparatus, a glass-wiping device having the suction apparatus and a run control method thereof. Once an outer suction cup in the suction apparatus fails and then an outer negative pressure chamber is disabled, the glass-wiping device can promptly take measures to prevent more small bumps from further entering an inner suction cup, thus avoiding the occurrence of the glass-wiping device falling off from a wall surface.

The present invention is implemented through the following technical solutions:

The suction apparatus according to the present invention comprises a suction cup unit including an inner suction cup 11 and an outer suction cup 12, the inner suction cup 11 being arranged inside the outer suction cup 12, a cavity inside the inner suction cup 11 forms an inner negative pressure chamber 13 by vacuum-pumping, a cavity between the inner suction cup 11 and the outer suction cups 12 forms an outer negative pressure chamber 14 by vacuum-pumping, wherein the outer negative pressure chamber 14 is connected to a vacuum detection unit comprising a deformable element 20 and a strain gauge 21, the deformable element 20 being hermetically attached on an opening 141 on the top of the outer negative pressure chamber 14, the strain gauge 21 being arranged on the deformable element 20.

A glass-wiping device according to the present invention comprises a suction apparatus 1, a running unit 2, a cleaning unit 3, a driver unit 4 and a controller unit 5, in which, the running unit 2 and the cleaning unit 3 are respectively arranged at the bottom of the glass-wiping device 8, the controller unit 5 is respectively connected with the cleaning unit 3 and the driver unit 4; under the control by the controller unit 5, the driver unit 4 controls the running unit 2 to run; the glass-wiping device sucks on a glass surface by the suction apparatus 1; the suction apparatus 1 comprises a suction cup unit including an inner suction cup 11 and an outer suction cup 12, the inner suction cup 11 being arranged inside the outer suction cup 12, a cavity inside the inner suction cup 11 forms an inner negative pressure chamber 13 by vacuum-pumping, and a cavity between the inner suction cup 11 and the outer suction cups 12 forms an outer negative pressure chamber 14 by vacuum-pumping, the glass-wiping device also comprises a vacuum detection unit which is respectively connected to the controller unit 5 and the outer negative pressure chamber 14.

Further, the vacuum detection unit comprises a deformable element 20 and a strain gauge 21, the deformable element 20 being hermetically attached on an opening 141 on the top of the outer negative pressure chamber 14, the strain gauge 21 being arranged on the deformable element 20 and being connected and outputting the vacuum detection data to the controller unit 5.

The controller unit 5 stores a vacuum threshold therein, and controls the glass-wiping device to stop or redirect if the vacuum detection data is less than or equal to the vacuum threshold.

The glass-wiping device is also provided with a timing unit, and the controller unit controls the glass-wiping device to stop or redirect if the vacuum detection data is less than or equal to the vacuum threshold upon an interval time t or a duration t elapsed.

Therein, $t=s/v$, in which, s represents the radial distance between the inner suction cup and the outer suction cup, and v represents the walking speed of the glass-wiping device.

Further, the suction apparatus also comprises an inner vacuum pump 15, an outer vacuum pump 16, an inner gas guide tube 17 and an outer gas guide tube 18, the inner suction cup 11 being connected to the inner vacuum pump 15 through the inner gas guide tube 16, and the outer suction cup 12 being connected to the outer vacuum pump 16 through the outer gas guide tube 18.

The glass-wiping device sucks on the glass surface by the inner negative pressure chamber 13 and/or the outer negative pressure chamber 14.

When only the inner suction cup 11 is sealed with the glass surface, the glass-wiping device sucks on the glass surface by the inner negative pressure chamber 13; or, when only the outer suction cup 13 is sealed with the glass surface, the inner negative pressure chamber 13 is communicated with the outer negative pressure chamber 14 to form a big negative pressure chamber by which the glass-wiping device sucks on the glass surface.

The inner negative chamber 13 is positioned in a space enclosed by the inner suction cup 11, the bottom of the glass-wiping device and the glass; the outer negative pressure chamber 14 is positioned in a space enclosed by the inner suction cup 11, the outer suction cup 12, the bottom of glass-wiping device and the glass.

The inner negative chamber 13 is positioned in a space enclosed by the inner suction cup 11 and the glass, and the outer negative pressure chamber 14 is positioned in a space enclosed by the inner suction cup 11, the outer suction cup 12 and the glass.

The inner suction cup 11 and the outer suction cup 12 can be coaxially arranged.

The present invention also provides a run control method for glass-wiping device comprising the following steps:

S1: the controller unit 5 controls an inner vacuum pump and an outer vacuum pump to start performing vacuum-pumping operation to the inner negative pressure chamber and the outer negative pressure chamber of the suction cup unit, thus the glass-wiping device 8 sucks on the a surface of a glass 6;

S2: the glass-wiping device 8 walks on the surface of the glass 6;

S3: the vacuum detection unit detects and sends the vacuum detection data to the controller unit 5;

S4: the controller unit 5 compares the vacuum detection data and a vacuum threshold, and controls the glass-wiping device 8 to stop walking or redirect if the vacuum detection data is less than or equal to the vacuum threshold; otherwise, the glass-wiping device 8 continues to walk.

Preferably, the step S4 specifically comprises the following steps: the controller unit 5 controls the glass-wiping device 8 to stop or redirect if the vacuum detection data is still less than or equal to the vacuum threshold upon an interval time t or a duration t elapsed.

Therein, t=s/v, in which, s represents the radial distance between the inner suction cup and the outer suction cup, and v represents the walking speed of the glass-wiping device.

The glass-wiping device according to the present invention is provided with a suction apparatus. Once the outer suction cup in the suction apparatus fails and then the outer negative pressure chamber is disabled, the glass-wiping device will take measures promptly to prevent more small bumps from further entering the inner suction cup, thus avoid the occurrence of the glass-wiping device falling off a wall surface.

DESCRIPTION OF ATTACHED DRAWINGS

Figure 1:
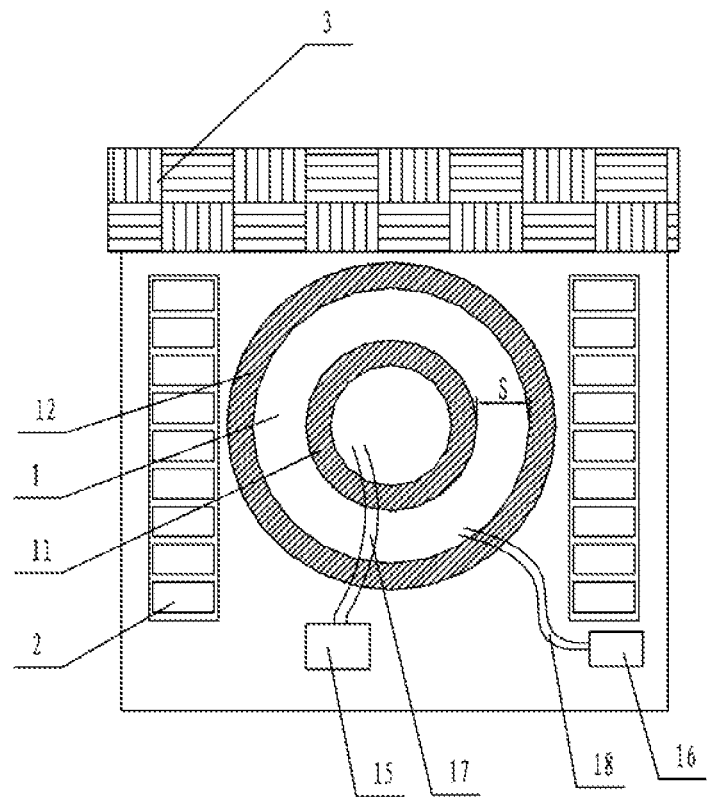
FIG. 1 is the structure diagram of the glass-wiping device of the present invention.

SYMBOLS IN THE ATTACHED DRAWINGS 1. suction apparatus 2. running unit 3. cleaning unit 4. driver unit 5. controller unit 6. glass 7. small bumps 8. glass-wiping device 11. inner suction cup 12. outer suction cup 13. inner negative pressure chamber 14. outer negative pressure chamber 15. inner vacuum pump 16. outer vacuum pump 17. inner gas guide tube 18. outer gas guide tube 20. deformable element 21. strain gauge 141. opening 211. strain gauge wire harness

DETAILED DESCRIPTION OF PREFERRED EMBODIMENTS

Figure 2:
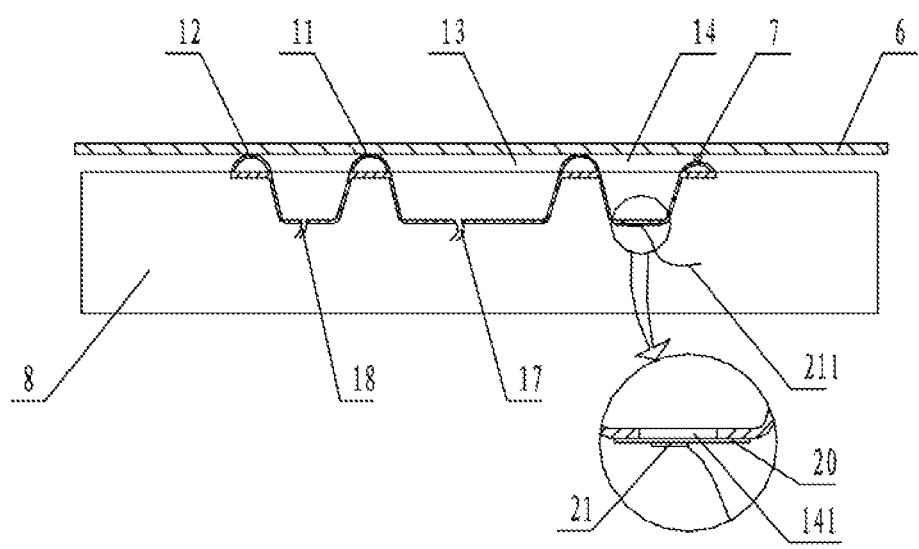
FIG. 2 is the schematic diagram of the glass-wiping device of the present invention sucking on a glass (there are small bumps on the glass)
Figure 3:
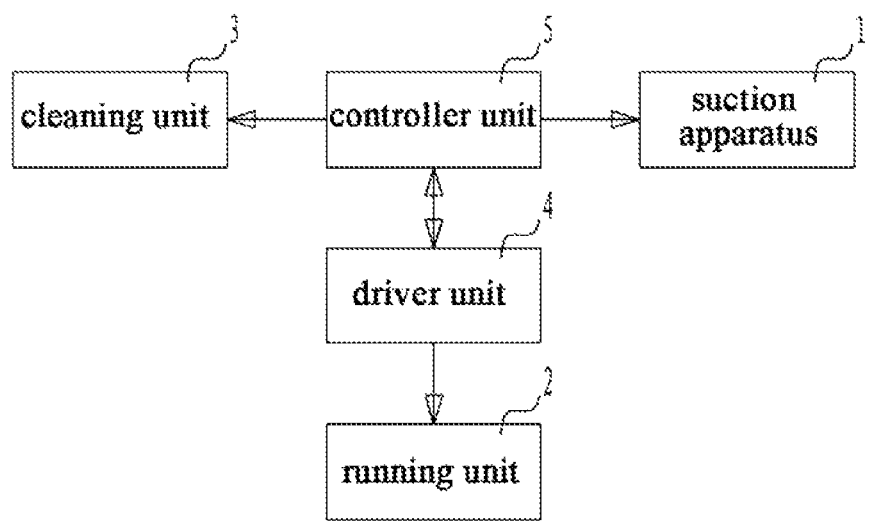
FIG. 3 is the schematic control diagram of the glass-wiping device of the present invention.

FIG. 1 is the structure diagram of the glass-wiping device of the present invention; FIG. 2 is the schematic diagram of the glass-wiping device of the present invention sucking on a glass (there are small bumps on the glass); FIG. 3 is the schematic control diagram of the glass-wiping device of the present invention.

As shown in FIG. 1, the suction apparatus according to the present invention comprises a suction cup unit including an inner suction cup 11 and an outer suction cup 12, the inner suction cup 11 being arranged inside the outer suction cup 12, wherein a cavity inside the inner suction cup 11 forms an inner negative pressure chamber 13 by vacuum-pumping, and a cavity between the inner and outer suction cups forms an outer negative pressure chamber 14 by vacuum-pumping, and the outer negative pressure chamber 14 is connected to a vacuum detection unit comprising a deformable element 20 and a strain gauge 21, the deformable element 20 being hermetically attached on an opening 141 on the top of the outer negative pressure chamber 14, and the strain gauge 21 being arranged on the deformable element 20.

As shown in FIGS. 2-3, the glass-wiping device of the present invention comprises a suction apparatus 1, a running unit 2, a cleaning unit 3, a driver unit 4 and a controller unit 5, in which, the running unit 2 and the cleaning unit 3 are respectively arranged at the bottom of the glass-wiping device 8, and the controller unit 5 is respectively connected with the cleaning unit 3 and the driver unit 4. Under the control by the controller unit 5, the driver unit 4 controls the running unit 2 to run, and the glass-wiping device 8 sucks on the surface of the glass by the suction apparatus 1. The suction apparatus 1 comprises a suction cup unit including an inner suction cup 11 and an outer suction cup 12, the inner suction cup 11 being arranged inside the outer suction cup 12, wherein a cavity inside the inner suction cup 11 forms an inner negative pressure chamber 13 by vacuum-pumping, and a cavity between the inner and outer suction cups forms an outer negative pressure chamber 14 by vacuum-pumping. The glass-wiping device also comprises a vacuum detection unit which is respectively connected to the controller unit 5 and the outer negative pressure chamber 14. The running unit 2, the cleaning unit 3, the driver unit 4, and the controller unit 5 herein may be implemented with conventional structures in the prior art. For example, the running unit may be driving wheel, crawler or the like, the cleaning unit may be duster cloth, rolling brush, suction nozzle for cleaning, or the like. the driver unit and the controller unit may be motor and controller that are commonly used in the art, respectively.

Further, the vacuum detection unit comprises a deformable element 20 and a strain gauge 21, the deformable element 20 being hermitically attached on an opening 141 on the top of the outer negative pressure chamber 14, and the strain gauge 21 being arranged on the deformable element 20. The strain gauge 21 is connected to the controller unit 5 and outputs vacuum detection data to the controller unit 5 through a strain gauge wire harness 211. The controller unit 5 stores a vacuum threshold therein, and controls the glass-wiping device to stop or redirect if the vacuum detection data is less than or equal to the vacuum threshold.

In order to further determine whether there are dangerous areas such as many small bumps or big cracks, the glass-wiping device is also provided with a timing unit. Upon an interval time t or a duration t elapsed, if the vacuum detection data is less than or equal to the vacuum threshold, the controller unit controls the glass-wiping device to stop or redirect. The timing unit herein may be implemented with conventional structures in the prior art.

Therein, t=s/v, in which, s represents the radial distance between the inner suction cup and the outer suction cup, and v represents the walking speed of the glass-wiping device.

Further, the suction apparatus also comprises an inner vacuum pump 15, an outer vacuum pump 16, an inner gas guide tube 17 and an outer gas guide tube 18, wherein the inner suction cup 11 is connected with the inner vacuum pump 15 through the inner gas guide tube 16, and the outer suction cup 12 is connected with the outer vacuum pump 16 through the outer gas guide tube 18.

The glass-wiping device 8 sucks on a glass surface by the inner negative pressure chamber 13 and/or the outer negative pressure chamber 14.

In a normal operation, the glass-wiping device sucks on the glass surface by both the inner negative pressure chamber 13 and the outer negative pressure chamber 14. When the outer suction cup 12 encounters a small bump 7, it will be jacked up, thus the outer negative pressure chamber 14 is disabled. At this time, only the inner suction cup 11 is sealed with the glass surface, and the glass-wiping device sucks on the glass surface by the inner negative pressure chamber 13. While the glass-wiping device continues to walk, if the inner suction cup 11 encounters a small bump 7, it will be jacked up, with only the outer suction cup 12 being sealed with the glass surface. The inner negative pressure chamber 13 is communicated with the outer negative pressure chamber 14 to form a big negative pressure chamber by which the glass-wiping device sucks on the glass surface.

The structures of the inner and outer negative pressure chambers have two configurations:

The inner negative chamber 13 is positioned in a space enclosed by the inner suction cup 11, the bottom of the glass-wiping device and the glass, and the outer negative pressure chamber 14 is positioned in a space enclosed by the inner suction cup 11, the outer suction cup 12, the bottom of glass-wiping device and the glass.

The inner negative chamber 13 is positioned in a space enclosed by the inner suction cup 11 and the glass, and the outer negative pressure chamber 14 is positioned in a space enclosed by the inner suction cup 11, the outer suction cup 12 and the glass.

The inner suction cup 11 and the outer suction cup 12 can be coaxially arranged.

Further, the glass-wiping device is also provided with a cleaning unit 3 and a driver unit 4. The running unit 2 and the cleaning unit 3 are respectively arranged at the bottom of the glass-wiping device 8, and the controller unit 5 is respectively connected to the cleaning unit 3, the driver unit 4 and a vacuum detection unit. Under the control by the controller unit 5, the driver unit 4 controls the running unit 2 to run.

The present invention also provides a run control method for the glass-wiping device, comprising the following steps:

S1: The controller unit 5 controls an inner vacuum pump and an outer vacuum pump to start performing vacuum-pumping operation to the inner negative pressure chamber and the outer negative pressure chamber of the suction cup unit, so that the glass-wiping device 8 sucks on a surface of a glass 6;

S2: The glass-wiping device walks on the surface of the glass 6;

S3: The vacuum detection unit detects and sends the vacuum detection data to the controller unit 5;

S4: The controller unit 5 compares the vacuum detection data and a vacuum threshold, and controls the glass-wiping device 8 to stop walking or redirect if the vacuum detection data is less than or equal to the vacuum threshold; otherwise, the glass-wiping device 8 continues to walk.

Preferably, the step S4 specifically comprises the following steps: the controller unit 5 controls the glass-wiping device 8 to stop or redirect if the vacuum detection data is still less than or equal to the vacuum threshold upon an interval time t or a duration t elapsed.

Therein, $t=s/v$, in which, s represents the radial distance between the inner suction cup and the outer suction cup, and v represents the walking speed of the glass-wiping device.

A process of alarming when the glass-wiping device of the present invention encounters more small bumps will be described in particular as follows.

As shown in FIG. 2, the suction apparatus in the glass-wiping device of the present invention comprises an inner suction cup 11 and an outer suction cup 12, an outer negative pressure chamber 14 is positioned between the inner and the outer suction cups, an inner negative pressure chamber 13 is positioned inside the inner suction cup 11, and the inner and outer negative pressure chambers are gas-pumped respectively by the inner vacuum pump 15 and the outer vacuum pump 16. The vacuum detection unit in the suction apparatus is respectively connected to the controller unit 5 and the outer negative pressure chamber 14, and comprises a deformable element 20 and a strain gauge 21. An opening 141 is provided on the top of the outer negative pressure chamber 14, and the deformable element 20, which is a metal plate, is hermetically attached on the opening 141. A strain gauge 21 is attached on the deformable element 20 in an area corresponding to the opening and is used to sense the vacuum degree of the outer negative pressure chamber 14. The strain gauge 21 is an electronic component connected to the controller unit 5 through a signal line, wherein the strain gauge can adopt a metal resistance strain gauge or a semiconductor resistance strain gauge and the like in the prior art.

When the glass-wiping device 8 encounters the small bumps 7 on the glass 6, the outer suction cup 12 is jacked up by the small bumps 7 and thus fails, so that the outer negative pressure chamber 14 is disabled. After the strain gauge 21 senses such pressure variation, it connects and outputs a vacuum detection data to the controller unit 5. The controller unit 5 controls the glass-wiping device to stop or redirect according to the vacuum detection data input from the vacuum detection unit. The controller unit 5 stores a vacuum threshold therein, and controls the glass-wiping device to stop or redirect if the vacuum detection data is less than or equal to the vacuum threshold.

If encountering only one small bump or a small crack, the glass-wiping device can step over it through the inner and the outer suction cups. However, if encountering many small bumps or a big crack, the glass-wiping device is unable to step over this dangerous area, and it is necessary to avoid such area promptly. Furthermore, the glass-wiping device is also provided with a timing unit (not shown in the figure). Upon an interval time t or a duration t elapsed, if the vacuum detection data is still less than or equal to the vacuum threshold, the controller unit determines that there are many small bumps or a big crack in this area and thus controls the glass-wiping device to stop or redirect, namely, the controller unit 5 immediately sends signals to the running unit, enabling the device to retreat or keep static in situ, so as to prevent small bumps 7 from further entering the inner suction cup 11 and jacking up the inner suction cup 11, thus avoiding the occurrence of the glass-wiping device falling off from a wall surface.

The invention claimed is:

1. A glass-wiping device comprising a suction apparatus (1), a running unit (2), a cleaning unit (3), a driver unit (4) and a controller unit (5), in which the running unit (2) and the cleaning unit (3) are respectively arranged at the bottom side of the glass-wiping device (8) that is attached to the glass by the suction apparatus, the controller unit (5) is connected with the driver unit (4); under the control by the controller unit (5), the driver unit (4) controls the running unit (2) to run; the glass-wiping device sucks on a glass surface by the suction apparatus (1); the suction apparatus (1) comprises a suction cup unit, characterized in that, the suction cup unit includes an inner suction cup (11) and an outer suction cup (12), the inner suction cup (11) being arranged inside the outer suction cup (12), a cavity inside the inner suction cup (11) forms an inner negative pressure chamber (13) by vacuum-pumping, and a cavity between the inner suction cup (11) and the outer suction cups (12) forms an outer negative pressure chamber (14) by vacuum-pumping, the glass-wiping device also comprises a vacuum detection unit which is respectively connected to the controller unit (5) and the outer negative pressure chamber (14), wherein, the controller unit (5) controls the glass-wiping device to stop or redirect if a vacuum detection data is less than or equal to a vacuum threshold upon a duration t elapsed, and wherein, t=s/v in which, s represents the radial distance between the inner suction cup and the outer suction cup, and v represents the walking speed of the glass-wiping device.

2. The glass-wiping device of claim 1, characterized in that, the vacuum detection unit comprises a deformable element (20) and a strain gauge (21), the deformable element (20) being hermetically attached on an opening (141) on the top of the outer negative pressure chamber (14), the strain gauge (21) being arranged on the deformable element (20) and being connected and outputting the vacuum detection data to the controller unit (5).

3. The glass-wiping device of claim 1, characterized in that, the controller unit (5) stores a vacuum threshold therein, and controls the glass-wiping device to stop or redirect if a vacuum detection data is less than or equal to the vacuum threshold.

4. The glass-wiping device of claim 3, characterized in that, the glass-wiping device is also provided with a timing unit, and the controller unit controls the glass-wiping device to stop or redirect if the vacuum detection data is less than or equal to the vacuum threshold upon an interval time t or a duration t elapsed.

5. The glass-wiping device of claim 1, characterized in that, the suction apparatus also comprises an inner vacuum pump (15), an outer vacuum pump (16), an inner gas guide tube (17) and an outer gas guide tube (18), the inner suction cup (11) being connected to the inner vacuum pump (15) through the inner gas guide tube (16), and the outer suction cup (12) being connected to the outer vacuum pump (16) through the outer gas guide tube (18).

6. The glass-wiping device of claim 1, characterized in that, the glass-wiping device sucks on a glass surface by the inner negative pressure chamber (13) and/or the outer negative pressure chamber (14).

7. The glass-wiping device of claim 1, characterized in that, when only the inner suction cup (11) is sealed with the glass surface, the glass-wiping device sucks on the glass surface by the inner negative pressure chamber (13); or, when only the outer suction cup (13) is sealed with the glass surface, the inner negative pressure chamber (13) is communicated with the outer negative pressure chamber (14) to form a big negative pressure chamber by which the glass-wiping device sucks on the glass surface.

8. The glass-wiping device according to claim 1, characterized in that, the inner negative chamber (13) is positioned in a space enclosed by the inner suction cup (11), the bottom of the glass-wiping device and a glass; the outer negative pressure chamber (14) is positioned in a space enclosed by the inner suction cup (11), the outer suction cup (12), the bottom of glass-wiping device and the glass.

9. The glass-wiping device according to claim 1, characterized in that, the inner negative chamber (13) is positioned in a space enclosed by the inner suction cup (11) and a glass, and the outer negative pressure chamber (14) is positioned in a space enclosed by the inner suction cup (11), the outer suction cup (12) and the glass.

10. A run control method of a glass-wiping device, the glass-wiping device comprising a suction apparatus (1), running unit (2), a cleaning unit (3), a driver unit (4) and a controller unit (5), in which the running unit (2) and the cleaning unit (3) are respectively arranged at the side of the glass-wiping device (8) that is attached to the glass by the suction apparatus, the controller unit (5) is connected with the driver unit (4); under the control by the controller unit (5), the driver unit (4) controls the running unit (2) to run; the glass-wiping device sucks on a glass surface by the suction apparatus (1); the suction apparatus (1) comprises a suction cup unit, the suction cup unit includes an inner suction cup (11) and an outer suction cup (12), the inner suction cup (11) being arranged inside the outer suction cup (12), a cavity inside the inner suction cup (11) forms an inner negative pressure chamber (13) by vacuum-pumping, and a cavity between the inner suction cup (11) and the outer suction cups (12) forms an outer negative pressure chamber (14) by vacuum-pumping, the glass-wiping device also comprises a vacuum detection unit which is respectively connected to the controller unit (5) and the outer negative pressure chamber (14), the run control method comprises the following steps:

S1: the controller unit (5) controls an inner vacuum pump and an outer vacuum pump to start performing vacuum-pumping operation to the inner negative pressure chamber and the outer negative pressure chamber of the suction cup unit, thus the glass-wiping device (8) sticks on a surface of a glass (6);

S2: the glass-wiping device (8) walks on the surface of the glass (6);

S3: the vacuum detection unit detects and sends a vacuum detection data to the controller unit (5);

S4: the controller unit (5) compares the vacuum detection data and an vacuum threshold, and controls the glass-wiping device (8) to stop walking or redirect if the vacuum detection data is less than or equal to the vacuum threshold; otherwise, the glass-wiping device (8) continues to walk, wherein the step S4 specifically comprises the following steps: the controller unit (5) controls the glass-wiping device (8) to stop or redirect if the vacuum detection data is still less than or equal to the vacuum threshold upon a duration t elapsed, t=s/v, in which, s represents the radial distance between the inner suction cup and the outer suction cup, and v represents the walking speed of the glass-wiping device.

* * * * *